E. CRAIG & W. H. RAY.
WIRE BOUND CRATE SIDE MACHINE.
APPLICATION FILED MAR. 20, 1912.
1,254,779.
Patented Jan. 29, 1918.
7 SHEETS—SHEET 7.
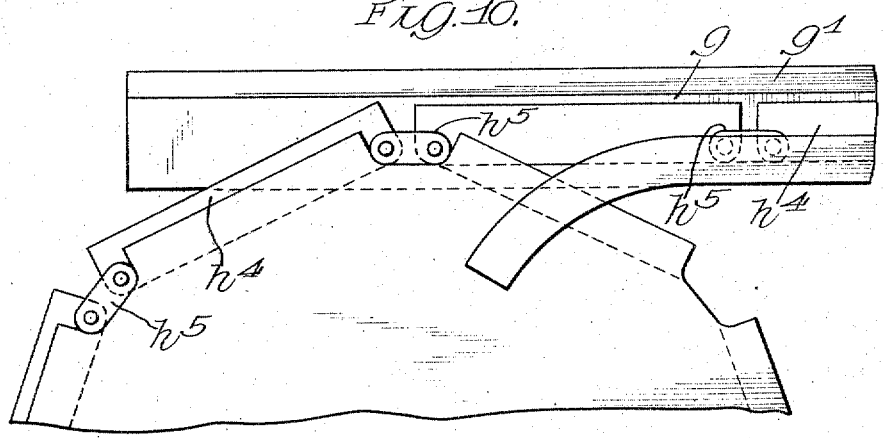
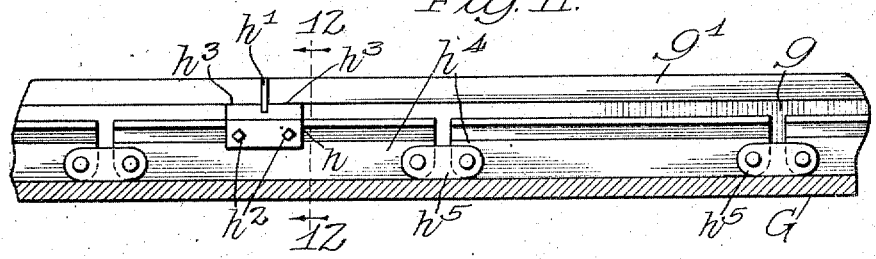
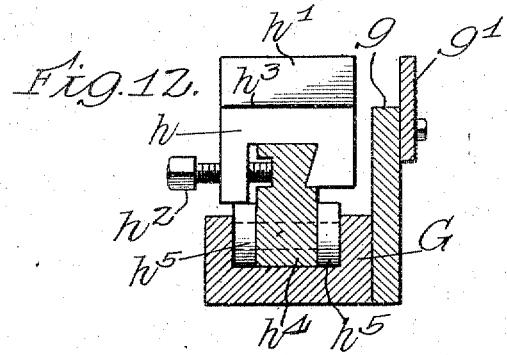
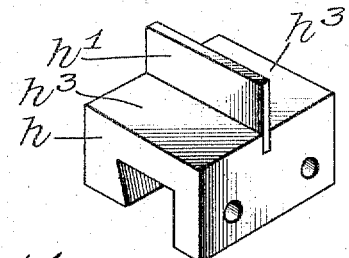
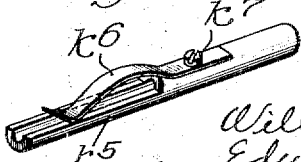

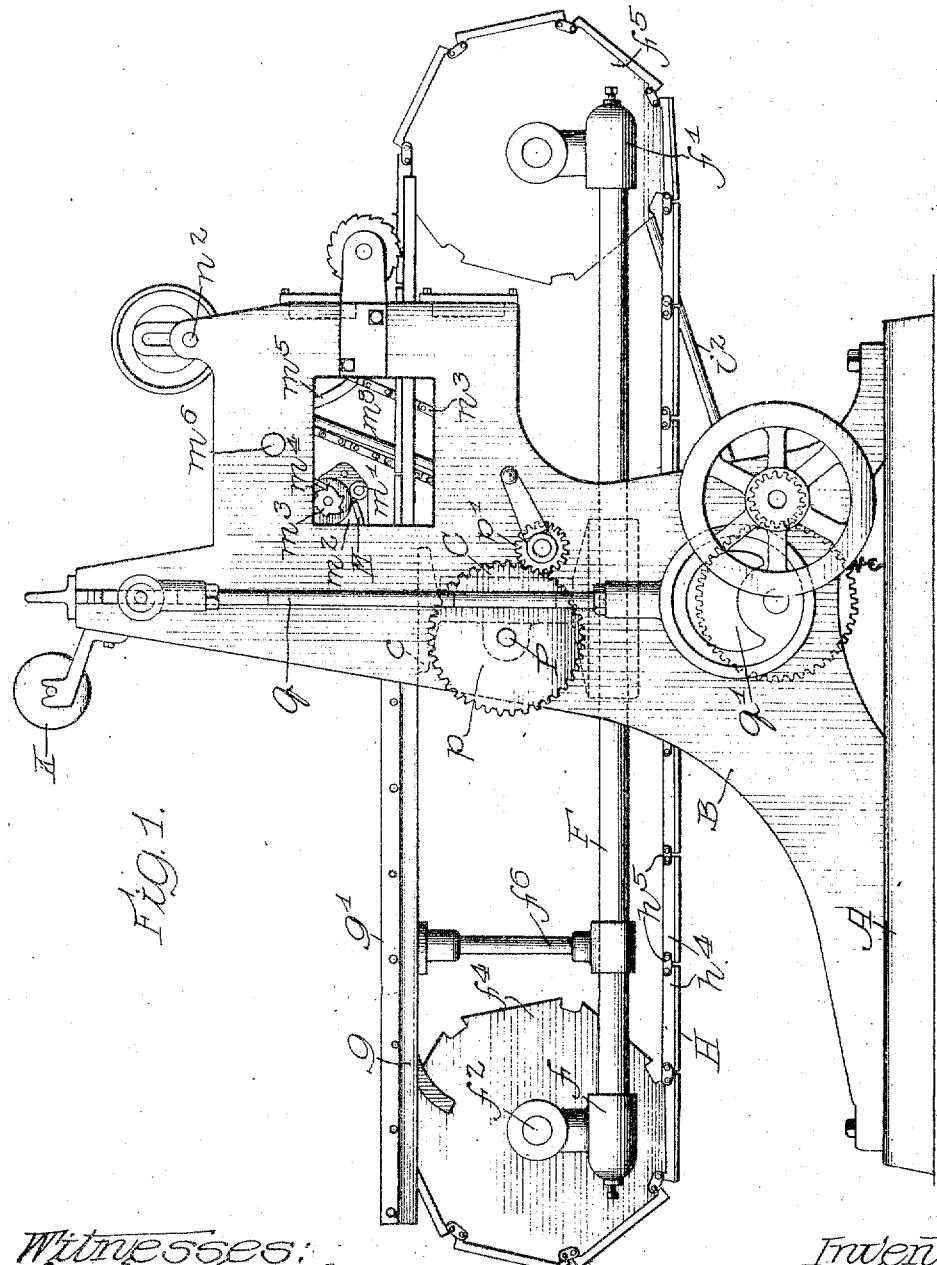

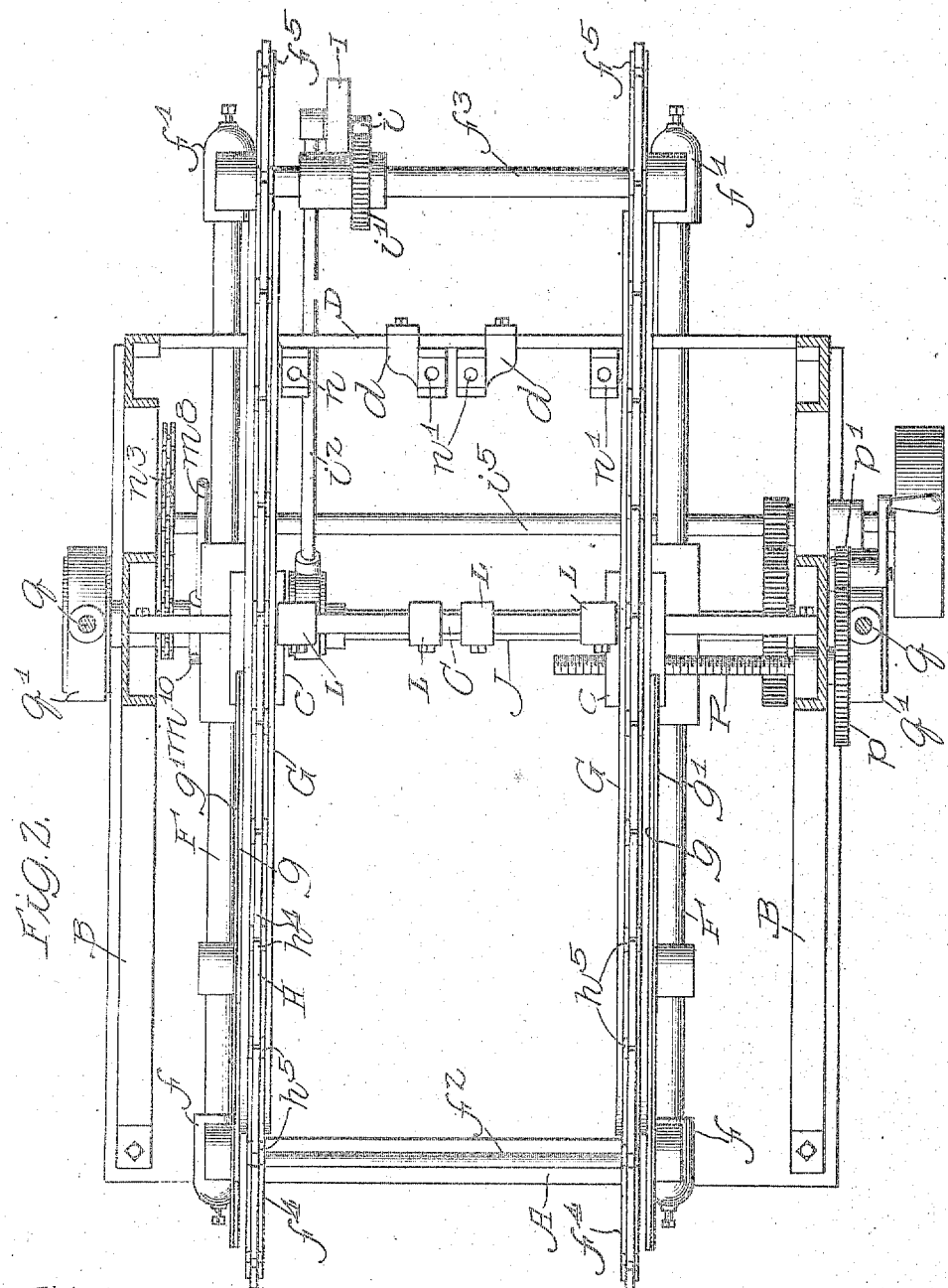

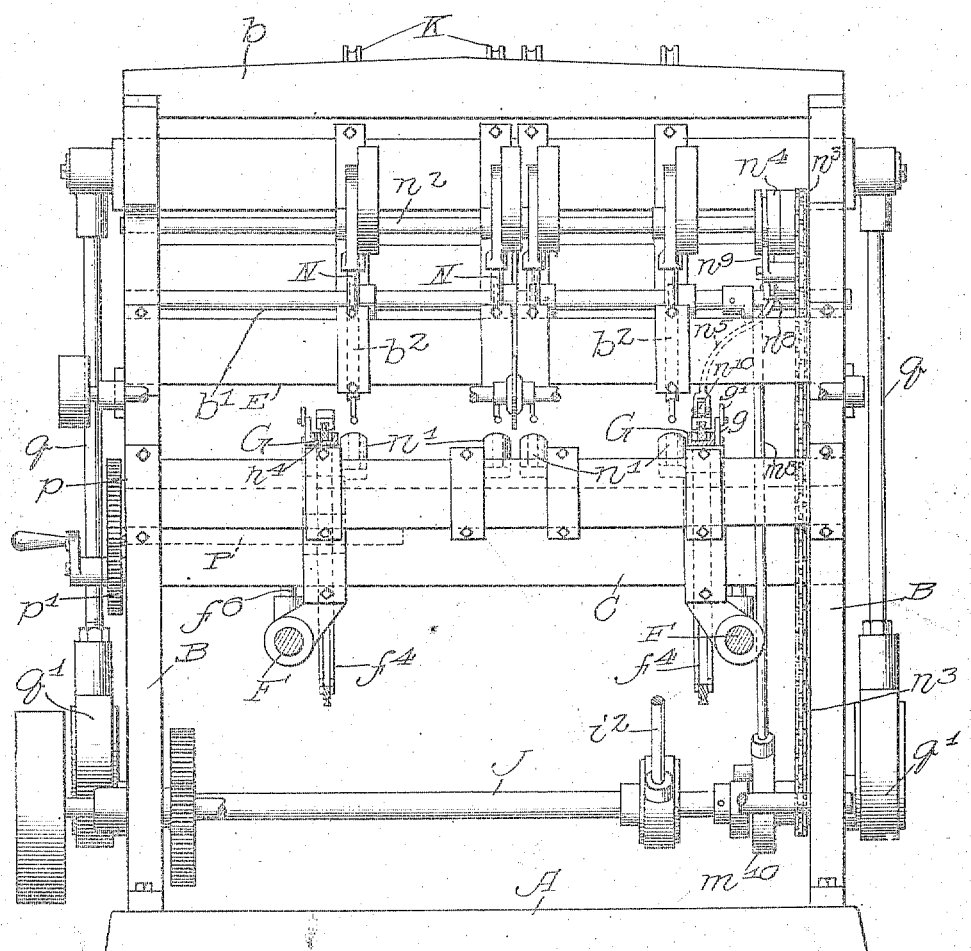

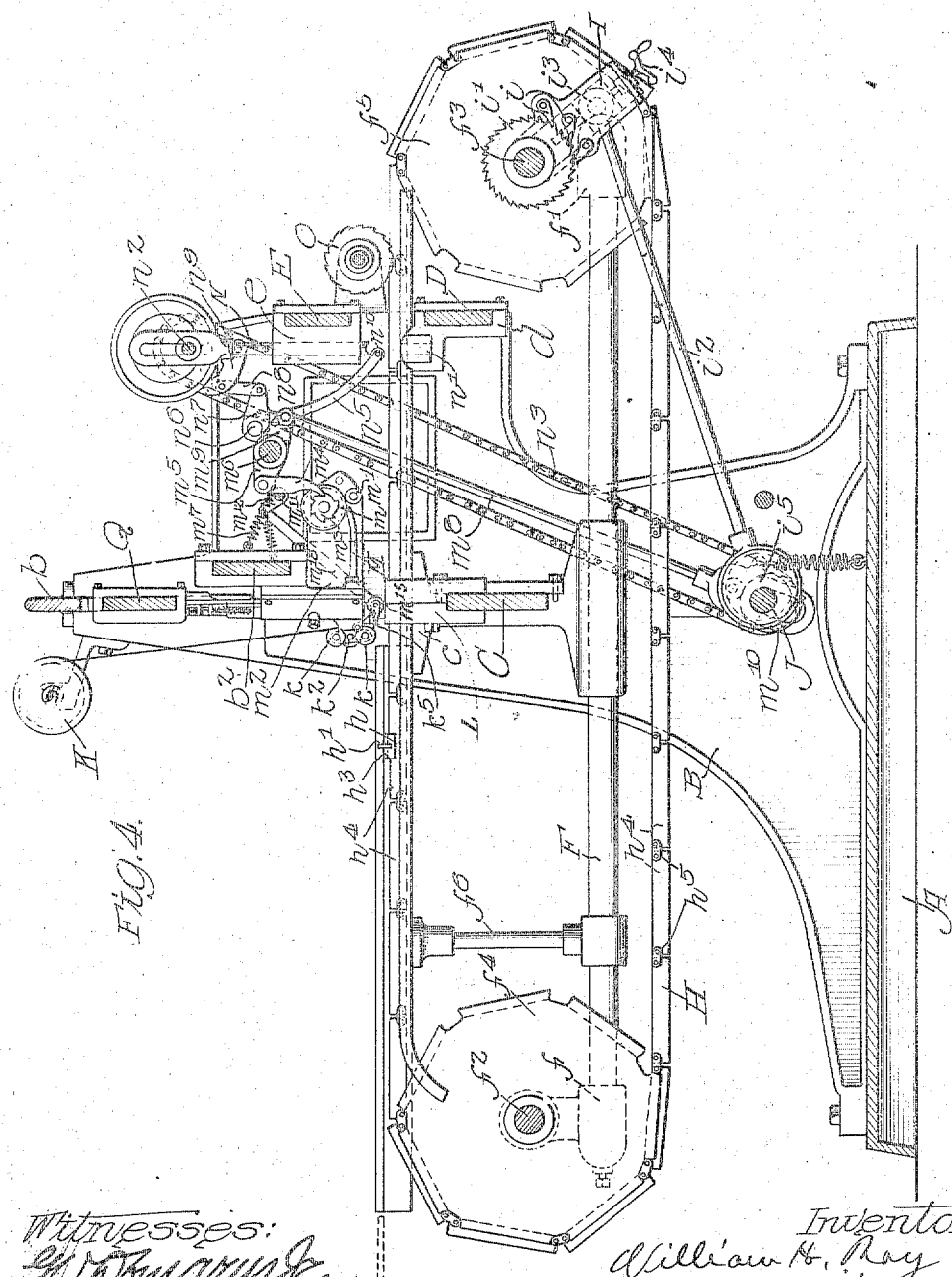

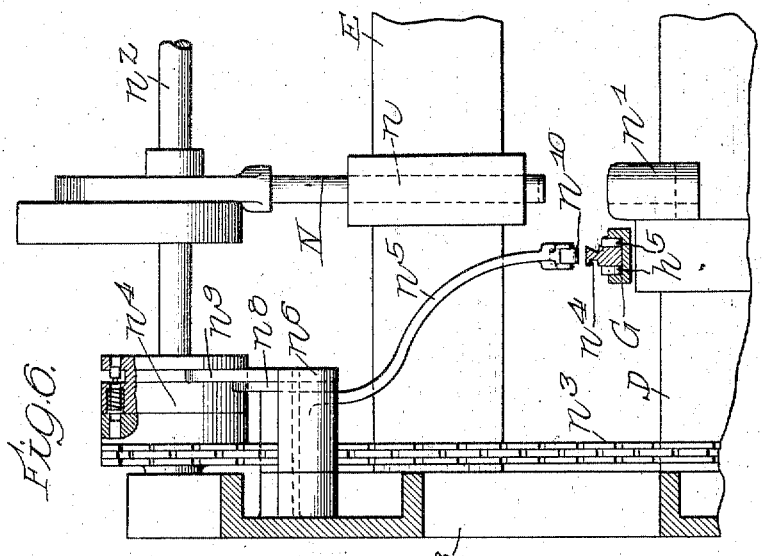
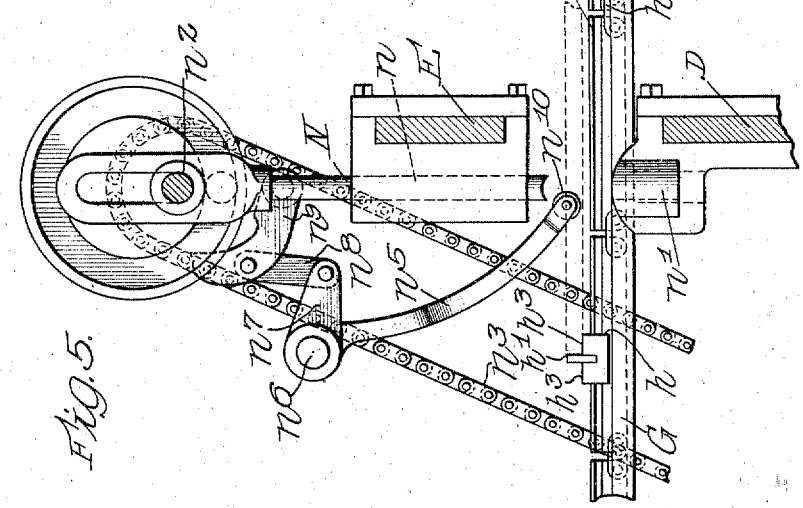

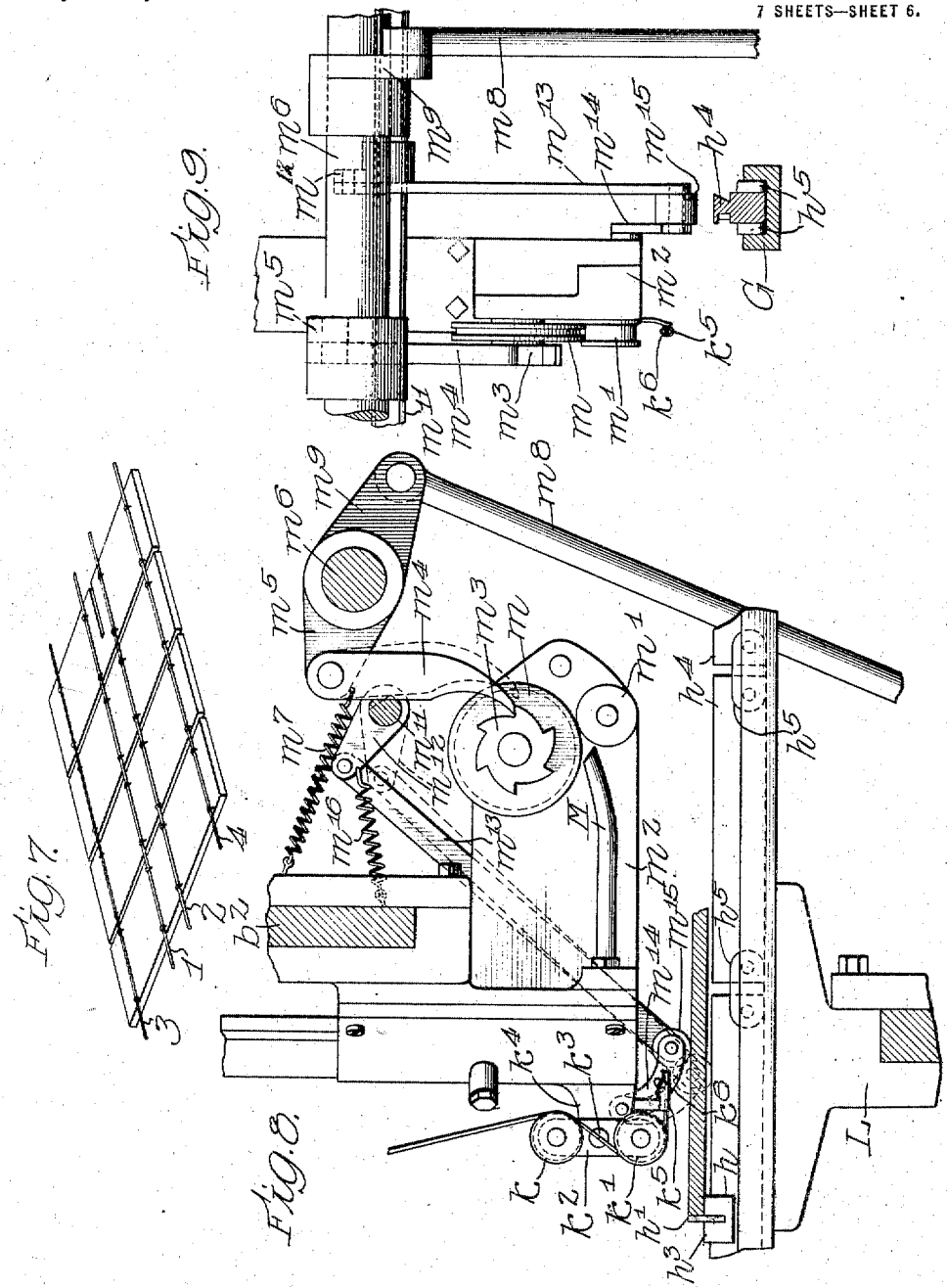

UNITED STATES PATENT OFFICE.

EDWARD CRAIG AND WILLIAM H. RAY, OF ST. JOSEPH, MICHIGAN.

WIRE-BOUND-CRATE-SIDE MACHINE.

1,254,779.  Specification of Letters Patent.  Patented Jan. 29, 1918.

Application filed March 20, 1912. Serial No. 684,971.

*To all whom it may concern:*

Be it known that we, EDWARD CRAIG and WILLIAM H. RAY, citizens of the United States of America, and residents of St. Joseph, Berrien county, Michigan, have invented certain new and useful improvements in Wire-Bound-Crate-Side Machines, of which the following is a specification.

Our invention relates to machinery for stapling materials. It relates more particularly to machinery for making box blanks, and especially those adapted for applying parallel binding wires to veneer or other sheet material.

An object of our invention is to provide a simple and efficient machine for applying parallel binding wires, or their equivalent, or similar reinforcing members, to strips of veneer or other sheet material.

Another object is to provide a machine of this kind in which simple and effective means are provided for preventing the driving of staples between the ends of adjacent blanks.

Another object is to provide a machine of this kind having simple and effective means for automatically cutting the wire or other binding members between the ends of adjacent blanks.

Another object is to provide a machine of this kind in which effective means are provided for tensioning the binding wires, and for exerting pressure thereon to hold the same in place by friction when the wires are cut, and whereby the said binding wires are prevented from becoming disarranged relative to the staplers.

Another object is to provide a machine of this kind in which simple and improved means are provided for operating the feed mechanism by which the staple wires are fed to the staplers.

It is also an object to provide certain details and features of improvement tending to increase the general efficiency and serviceability of a machine of this particular character, and whereby the use of certain features of construction and methods of manufacture heretofore considered necessary or desirable is avoided.

To the foregoing and other useful ends our invention consists in matters hereinafter set forth and claimed.

In the accompanying drawings:

Figure 1, is a side elevation of an automatic wiring machine embodying the principles of our invention.

Fig. 2, is a plan of the said machine.

Fig. 3, is a rear end elevation of the said machine, with certain portions thereof shown in vertical section, and certain other parts broken away for convenience of illustration.

Fig. 4, is a longitudinal section of said machine.

Fig. 5, is an enlarged detail view of the mechanism for automatically cutting or severing the binding wires between the ends of adjacent blanks.

Fig. 6, is a front elevation of the mechanism shown in Fig. 5.

Fig. 7, is a perspective of one of the large blanks made by a machine embodying the principles of our invention, showing the same partially cut or severed at one end, which cutting or severing operation is for the purpose of dividing this large or double blank into two relatively small blanks, it being easier and more economical to make two blanks this way, and by practically one and the same operation, than by making the two small blanks successively, or by making two such small blanks in separate and independent machines.

Fig. 8, is an enlarged detail side elevation of one of the stapling heads, showing the staple wire feed mechanism, and showing also the mechanism by which this wire feed mechanism is automatically controlled by the traveling movement of the endless work holder, or by the traveling movement of the work itself.

Fig. 9, is a rear elevation of the mechanism shown in Fig. 8.

Fig. 10, is an enlarged side elevation of one of the sprocket wheels for the work holder, showing the adjacent portion of the said sprocket chain or work holder, and showing also a portion of the means for guiding the stock.

Fig. 11, is a side elevation of a portion of one of the sprocket chains, showing the support or guide therefor in longitudinal section.

Fig. 12, is an enlarged section on the line 12—12 in Fig. 11.

Fig. 13, is a perspective of one of the spacing blocks employed on the said sprocket chains of the said endless traveling work holder.

Fig. 14, is a perspective of one of the guiding tubes employed on the staplers, which tubes guide the staple wires, each tube being provided with a spring which exerts pressure downwardly upon the wire to produce sufficient friction to prevent the wire from slipping out of the guide when it is automatically cut or severed at a point farther on by the means for so doing.

As thus illustrated, our invention comprises a base A upon which are mounted the two upright castings or side frames B by which the various operative parts of the machine are supported in suitably elevated positions. These side frames are connected at their upper ends by a rigid cross bar $b$, and at a point lower down by the usual bar $b^1$ upon which the staplers $b^2$, of any suitable character, are supported in the usual manner, and are adapted for lateral adjustment when it is desired to change or vary the width of the blanks.

As shown, there are four of these staplers, and the middle staplers are disposed close together to apply the middle two wires 1 and 2 of the blank shown in Fig. 7, this being a double blank. The outer staplers apply the wires 3 and 4 of said blank. The side frames B are also connected by the cross bars C and D, which bar C is provided with adjustable brackets $c$. A cross bar E connects the two frames at a point above the bar D. The round bars F are held in the brackets $c$, and are provided at their ends with brackets $f$ $f^1$, which serve as bearings for the shafts $f^2$ $f^3$ upon which are mounted the sprocket wheels $f^4$ $f^5$, these bars being disposed horizontally and longitudinally of the machine. The longitudinal tracks or ways G are supported by the brackets $c$, and by the the other brackets $f^6$ on the bars F, whereby these tracks or ways are adjustable laterally to vary the width of the blanks.

The two sprocket chains H are mounted on the said sprocket wheels, and arranged to travel in the tracks G, whereby the upper portions of said sprocket chains are supported for the traveling movement longitudinally of the machine.

As shown, these sprocket chains are provided with spacing blocks $h$, having spacing projections $h^1$ upon the upper surfaces thereof, said blocks being adjustably held on said chains by set screws $h^2$, whereby the distance between these blocks can be varied in accordance with the width of the stock or sheets of veneer. It will be understood that as many of these blocks can be employed as necessary, one being shown for convenience of illustration as they are all alike. These blocks can be placed and arranged in such manner that spaces of any desired size will be left between the blanks. For example, four strips of veneer can be placed in position for a blank, and then a strip can be omitted to form a space between this blank and the next one. These blocks provide shoulders $h^3$ upon which the sheets of veneer are supported in horizontal position. The edges of the said sheets are spaced apart by the projections $h^1$. The endless traveling work-holder thus provided is operated by a ratchet feed mechanism, consisting of an arm I pivoted on the shaft $f^3$, and provided with ratchet pawls $i$ adapted to engage the ratchet wheel $i^1$ which is fast on said shaft. The pitman $i^2$ is preferably connected with a block $i^3$ which is adjustable longitudinally of the arm I, by means of a hand screw $i^4$ extending from the end thereof. With this arrangement the length of the arm I is, in effect, varied or changed to regulate the action of the feed mechanism, the pitman $i^2$ being actuated by an eccentric $i^5$ on the main drive shaft J which crosses the machine at the bottom thereof. Preferably, the guides G are provided with flanges $g$ upon the upper edges of which the end portions of the sheets of veneer rest and slide along. And these outer end edges of the sheets of veneer are engaged by the guards $g^1$ secured upon the outer surfaces of the flanges $g$, in the manner shown more clearly in Fig. 12. Preferably, the said sprocket chains are composed of long links $h^4$, which are connected by intermediate or short links $h^5$, said long links being single and serving as a support for the spacing blocks $h$, each long link being grooved to engage the inner ends of the said screws $h^2$, and being grooved or beveled upon the outer surfaces thereof to engage correspondingly formed portions of said spacing blocks, whereby said blocks cannot be disconnected from the chains even when the said set screws are turned enough to permit the blocks to slide longitudinally of said links.

The binding wires are carried on reels K and are brought downward and around the guide rolls $k$ and $k^1$, which guide rolls are mounted one above the other upon a plate $k^2$, which is secured by a bolt $k^3$ to the bracket $k^4$ of the stapler, it being understood that a set of guide rolls of this character is provided for each stapler. It will be seen that the wire is arranged inside of the roll $k$ and outside of roll $k^1$, whereby a tension is given the binding wires, each binding wire then being guided horizontally below the stapler by the guide tube $k^5$, which is mounted in a suitable manner for vertical adjustment on the bracket $k^4$, each guide tube being cut away for a portion of its length, and each tube having a spring $k^6$ that bears down upon the wire at the place where the said tube is cut away. This spring is secured upon the tube by a screw $k^7$, and if desired, the construction may be such that the tension of the said spring can be adjusted by rotation of the said screw. The bolt $k^3$ is threaded at one end and provided with a nut whereby the angle of the plate $k^2$ may be changed at will to vary the tension of the wire, it being observed that the tension will be made greater by moving the guide roll $k$ toward the stapler, and the guide roll $k^1$ away from the stapler, as this will produce a more acute bend or kink in the wire, and the drag or back pull on the wires will be consequently greater. The staples are driven cross-wise of said binding wires, and as they pass through the sheets of veneer the points of the staples are clenched by the blocks or anvils L, which are adjustably mounted upon the cross bar C, whereby the distance between these said clench blocks can be varied in accordance with the distance between the staplers.

The mechanism for feeding the staple wire consists, in each case, of a feed tube M secured to the back of the stapler, and a pair of feed rolls $m$, $m^1$, disposed in a position to feed the wire into the outer end of said tube, said rolls being mounted on a bracket $m^2$ carried by the stapler. The roll $m$ is rigid with a ratchet wheel $m^3$, and this ratchet wheel is engaged by a dog or pawl $m^4$ carried on the end of the lever $m^5$, which is mounted on the rock shaft $m^6$, which shaft is supported by suitable bearings on the frame of the machine. This dog or pawl $m^4$ is held in engagement with the said ratchet wheel by a spring $m^7$, and the rock shaft $m^6$ is operated by a pitman $m^8$ having its upper end secured to the arm $m^9$ on said shaft. The lower end of this pitman $m^8$ is actuated by a cam $m^{10}$ mounted on the shaft J at the bottom of the machine. It will be understood that a suitable wire feed mechanism of this kind is provided for each stapler, and that the shaft $m^6$ carries as many feed pawls or dogs $m^4$ as there are staplers. The rock shaft $m^{11}$ extends across the machine in front of the pawls $m^4$, said shaft being provided with notches which receive the said dogs or pawls $m^4$, when the latter are to actuate the feed rolls for feeding the staple wire. This shaft $m^{11}$ has an arm $m^{12}$ which is connected by a rod or bar $m^{13}$ with an arm $m^{14}$, which has its upper end pivoted to the bottom of the stapler, and which has its lower end provided with a roll $m^{15}$ which bears upon the stock or veneer. A spring $m^{16}$ connects the upper end of the rod or bar $m^{13}$ with the casting of the stapler, and tends to hold the roll $m^{15}$ down in the position shown in dotted lines in Fig. 8. This, it will be seen, turns the shaft $m^{11}$ enough to cause the lower corners of the notches therein to engage the dogs or pawls $m^4$ and force them backward and into the position shown in dotted lines in Fig. 8, thus disengaging them from the sprocket wheels of the feed mechanism. It follows, therefore, that each time a gap or opening occurs in the surface of the veneer, which may be the space between the ends of adjacent blanks, the roll $m^{15}$ moves downward, and bears upon the chain of the workholder, thus automatically causing the staple wire feed mechanism of each stapler to be tripped out of operation, whereby no staples are driven during the passage of this space below the staplers. In other words, the staple wire feed mechanism of each stapler is automatically controlled by means engaging the top of the work, and by means operated by the traveling motion of the endless traveling workholder. Thus the staple wire is saved and economized to a considerable degree. Although the staplers are continuously operated, still no staples are formed or driven between the ends of the blanks. Moreover, it will be seen that the toggle movement employed for actuating the feed rolls is of a very powerful and effective character, whereby the staple wire feed mechanism of each stapler is operated with certainty.

The mechanism for cutting the wire between the ends of adjacent blanks is as follows:

The vertically reciprocating punches N work in blocks $n$ which are adjustable laterally on the cross bar E, each punch being disposed immediately over one of the parallel binding wires, and the lower end of each punch being received by a block or die $n^1$ adjustably carried on the cross-bar D. These punches are actuated at the upper ends by cam mechanism carried on the horizontal and transverse shaft $n^2$, which is supported in suitable bearings on the frame of the machine. This shaft is driven by a sprocket belt connection $n^3$, which is driven in turn by the shaft J at the bottom of the machine. The transmission from the said belt to the shaft $n^2$ is controlled by a clutch $n^4$ of any suitable known or approved character. This clutch is automatically controlled by a swinging arm $n^5$, which has its upper end pivoted at $n^6$, and which is rigid with the arm $n^7$, the latter being connected by a link $n^8$, with a catch or dog $n^9$, by which the said clutch is opened and closed. The lower end of this swinging arm $n^5$ is provided with a roll $n^{10}$ which rests upon the upper surface of the stock or veneer, and which falls into each depression or space in the work as the blanks travel along. The construction of the said clutch is such when the roll $n^{10}$ moves downward in one of the spaces between the ends of two adjacent blanks, the clutch is thereby automatically closed, and the shaft $n^2$ is rotated to cause the operation of said punches, with the result that the binding wires are severed at a suitable distance from the rear end of the blank which has passed forward from below the said punches. As soon as the roll $n^{10}$ strikes the forward edge of the next or following sheet of veneer, to which latter the wires have, of course, been secured, the said clutch is thereby automatically opened, with the result that the punches N are thrown out of operation, and the mechanism continues in this condition until the next opening or space occurs in the surface of the stock or veneer. It is obvious, of course, that with an endless traveling work-holder of this character the supporting surface thereof cannot always be equally divided into spaces of predetermined length for the blanks of a certain size, as at times the length of the blanks is liable to be such that an odd space will be left which is too long for a space between two blanks, and too short for a whole blank. In such case the automatic wire cutting mechanism N saves and economizes in the use of the wire, because when the blank ahead has passed the wires are cut and then, during the passing of this odd or useless space, the binding wires are not feeding forward, but to the contrary are standing still. At this time the said binding wires do not commence to feed forward again until the blank behind has moved up close enough to receive the first staples, and then immediately upon the driving of the said staples, and the consequent securing of the said wires to the said blank, the said wires begin to feed again.

As the machine is adapted to make two blanks at a time, a rotary saw O is provided at the rear end of the machine for severing the blanks along a line between the binding wires 1—2, whereby each double blank is divided into sections, each a complete blank in itself—that is, two blanks can be made at the same time, and it is found that it is easier and more economical to manufacture two blanks at the same time this way than by making them at the same time in two separate and distinct machines. In other words, the two blanks are made by practically one and the same operation, without any additional effort or labor on the part of the mechanics or operatives in attendance on the machine.

Also, an adjusting screw P is provided in the side of the machine and arranged to engage a threaded opening in a block or some other portion which is rigid with the track, G, at this side of the machine. A gear wheel $p$ is mounted on the said screw, which latter has its outer end supported for rotation on the frame of the machine. A pinion $p^1$ engages the gear wheel $p$ and is operated by a crank $p^2$, whereby simple and effective mechanism is provided for easily and quickly changing or varying the distance between the two sprocket chains, and between the two guides in which the said sprocket chains travel, when it is desired to change or vary the width of the blanks.

The staplers are operated in the usual and well known manner by a vertically reciprocating cross bar Q, which latter has each end connected by a pitman $q$ with the eccentric devices $q^1$ mounted on the outer ends of the shaft J. This shaft can be driven in any suitable or desired manner.

The said mechanism for automatically controlling the wire-feeding device for the stapler is, it will be seen, a modification of the device shown and described in Patent No. 1,132,515, in which the control is obtained by engagement with the traveling work-holder. But with the construction herein shown and described the control of the wire feeding device is by direct engagement with the tops of the blanks, and thus the successive spaces serve through the feeding motion to control the driving of the staples.

The machine shown and described is adapted for the making of cleatless blanks, and this avoids the use of various features of construction and methods of manufacture heretofore considered necessary or desirable, as will be readily understood by those skilled in the art. Obviously, however, certain features of the invention, including the automatic controllers $n^{13}$ and $n^5$, and their associated parts, can be employed in other environments, for various purposes, and are not necessarily limited to use in connection with a cleatless blank machine, as it is obvious that these features can be used in the manufacture of blanks of various kinds and descriptions. The invention, therefore, is not limited to the exact construction shown and described, or any particular use, or to any particular form of box blank.

What we claim as our invention is:

1. A machine for stapling suitably prepared materials together to form blanks for the sides of boxes or crates, comprising an endless traveling work holder for the blank materials, a stapler, a staple wire feed mechanism for said stapler, and means governed by the traveling motion of said work holder for automatically tripping out the said mechanism between blanks, without interrupting the reciprocation of the said stapler, said means including a controller therefor arranged to be engaged by the materials.

2. A machine for stapling suitably prepared materials together to form blanks for the sides of boxes or crates, comprising an endless traveling workholder for the blank materials, a stapler, a staple wire feed mechanism for said stapler, and means governed by the traveling motion of said workholder for automatically tripping out the said mechanism between blanks, without interrupting the reciprocation of the said stapler, said means comprising a device that bears on top of the moving work, and means whereby the said device moves downward between blanks.

3. A machine for stapling suitably prepared materials together to form blanks for the sides of boxes or crates, comprising an endless traveling workholder for the blank materials, a stapler, a staple wire feed mechanism for said stapler, means governed by the traveling motion of said work-holder for automatically tripping out the said mechanism between blanks, without interrupting the reciprocation of the said stapler, said means comprising a roller that bears on top of the moving work, and means whereby the said roller drops down against the work-holder between blanks.

4. A machine for stapling suitably prepared materials together to form blanks for the sides of boxes or crates, comprising an endless traveling work-holder for the blank materials, a stapler, a staple wire feed mechanism for said stapler, means governed by the traveling motion of said work-holder for automatically tripping out the said mechanism between blanks, without interrupting the reciprocation of the said stapler, said means comprising a member pivoted to drag on the work, a rock shaft, an arm on the rock shaft, and a link connecting the said arm with the said member.

5. A machine for stapling suitably prepared materials together to form blanks for the sides of boxes or crates, comprising an endless traveling work-holder for the blank materials, a stapler, a staple wire feed mechanism for said stapler, and means governed by the traveling motion of said work-holder for automatically tripping out the said mechanism between blanks, without interrupting the reciprocation of the said stapler, said means comprising a floating element resting on the moving work.

6. A machine for stapling suitably prepared materials to form blanks for the sides of boxes or crates, comprising means for moving the work along, means for wiring the blanks, and mechanism for cutting the blanks apart governed by the traveling movement of the said first-mentioned means, said mechanism having a controller therefor arranged to be engaged by the work.

7. A machine for stapling suitably prepared materials to form blanks for the sides of boxes or crates, comprising means for moving the work along, means for wiring the blanks, mechanism for cutting the blanks apart, and floating means resting on the moving work for automatically controlling said mechanism.

8. A machine for stapling suitably prepared materials to form blanks for the sides of boxes or crates, comprising means for moving the work along, means for wiring the blanks, mechanism for cutting the blanks apart, and means for engaging the moving work to automatically govern the said mechanism.

9. A machine for stapling suitably prepared materials to form blanks for the sides of boxes or crates, comprising means for moving the work along, means for wiring the blanks, mechanism for cutting the blanks apart, and means including a roller for engaging the upper surface of the moving work to automatically govern the said mechanism.

10. A machine for stapling suitably prepared materials to form blanks for the sides of boxes or crates, comprising means for moving the work along, mechanism for cutting the blanks apart, and power-transmitting connections for operating said mechanism, having a clutch governed by the operation of said first-mentioned means, said machine having means for applying binding wires to said blanks, and said mechanism comprising a device for cutting said wires, said clutch having a controller therefor arranged to be engaged by the work.

11. A machine for stapling suitably prepared materials to form blanks for the sides of boxes or crates, comprising means for moving the work along, means for wiring the blanks, mechanism for cutting the blanks apart, and power-transmitting connections for operating said mechanism, having a clutch governed by the traveling movement of the work for automatically controlling the said mechanism.

12. A machine for stapling suitably prepared materials to form blanks for the sides of boxes or crates, comprising means for moving the work along, means for wiring the blanks, and mechanism for cutting the blanks apart, said means comprising an endless traveling work-holder, and means governed by the traveling movement of the said work-holder, and by the relative positions of the blanks thereon, for automatically controlling said mechanism.

13. A machine for applying a binding member to sheet material, comprising a stapler, means for guiding the binding member below the stapler, and tension mechanism for exerting a back pull on said member at points adjacent and immediately in advance of said guiding means, said guiding means engaging the wire between said mechanism and stapler.

14. A machine for applying a binding member to sheet material, comprising a stapler, means for guiding the binding member below the stapler, and tension mechanism for exerting a back pull on said member at points adjacent and immediately in advance of said guiding means, said mechanism comprising one or more adjustable rolls, said guiding means engaging the wire between the stapler and one of said rolls.

15. A machine for applying a binding member to sheet material, comprising a stapler, means for guiding the binding member below the stapler, and tension mechanism for exerting a back pull on said member at points adjacent and immediately in advance of said guiding means, said mechanism comprising a pivoted support, and a pair of rolls mounted on said support, said guiding means engaging the wire between the stapler and one of said rolls.

16. A machine for stapling suitably prepared materials to form blanks for the sides of boxes or crates, comprising a stapler for fastening the materials together, instrumentalities for holding the materials in position, devices for causing relative movement between the stapler and materials, whereby the blanks are successively operated upon by said stapler, and mechanism having means for engaging the materials to control the operation of the stapler and thereby prevent the driving of staples between blanks, said means including a controller that rests upon the materials.

17. A machine for stapling suitably prepared materials to form blanks for the sides of boxes or crates, comprising a stapler for fastening the materials together, instrumentalities for holding the materials in position, devices for causing relative movement between the stapler and materials, whereby the blanks are successively operated upon by said stapler, and mechanism having means for engaging the materials to control the operation of the stapler and thereby prevent the driving of staples between blanks, said means including a pivoted controller that rests upon the materials, and said stapler being provided with a device for feeding wire thereto, said feeding device being governed by said controller.

18. A machine for stapling suitably prepared materials to form blanks for the sides of boxes or crates, comprising a stapler for fastening the materials together, instrumentalities for holding the materials in position, devices for causing relative movement between the stapler and materials, whereby the blanks are successively operated upon by said stapler, and mechanism having means for engaging the materials to control the operation of the stapler and thereby prevent the driving of staples between blanks, said means including a controller that rests upon the materials, said stapler and controller being in alinement with each other transversely of the machine.

19. A machine for stapling suitably prepared materials to form blanks for the sides of boxes or crates, comprising instrumentalities for successively producing the blanks in connected series, having provisions for making blanks of different lengths, and mechanism for cutting the blanks apart, said mechanism having means for engaging the blanks to properly time the operation of said mechanism.

20. A machine for stapling suitably prepared materials to form blanks for the sides of boxes or crates, comprising instrumentalities for successively producing the blanks in connected series, having provisions for making blanks of different lengths, and mechanism for cutting the blanks apart, said mechanism having means for engaging the blanks to properly time the operation of said mechanism and being provided with a clutch controlled by said means.

21. A machine for stapling suitably prepared materials to form blanks for the sides of boxes or crates, comprising instrumentalities for successively producing the blanks in connected series, having provisions for making blanks of different lengths, and mechanism for cutting the blanks apart, having means for engaging the blanks to properly time the operation of said mechanism, said means including a controller that rests upon the blanks, and said mechanism having a cutter disposed in alinement with the controller transversely of the machine.

22. A machine for stapling suitably prepared materials to form blanks for the sides of boxes or crates, comprising a stapler for fastening the materials together, instrumentalities for holding the materials in position, devices for causing relative movement between the stapler and the materials, whereby the blanks are successively operated upon by said stapler, mechanism having means for engaging the outside surface of the materials to control the operation of the stapler and thereby prevent the driving of staples between the blanks, and devices for guiding binding wire on to the surface engaged by said means, the blanks being spaced apart to provide wire ends of suitable length for each blank, and said means being directly controlled by the spaces between the blanks.

23. A machine for stapling suitably prepared materials to form blanks for the sides of boxes or crates, comprising instrumentalities for successively producing the blanks in connected series, having provisions for making blanks of different lengths, and mechanism for cutting the blanks apart, having means for engaging the blanks to properly time the operation of said mechanism, devices for guiding binding wire on to the blanks, the latter being spaced apart to provide wire ends of suitable length for each blank, and said means being directly controlled by the spaces between the blanks.

24. A machine for making box or crate blanks, comprising automatic stapling and work feeding devices coöperating to fasten the blank materials together in successively spaced relation, and mechanism including an element which is movable into and out of the plane of the blanks and arranged for automatically preventing the driving of staples between blanks, controlled by the forward feeding motion of the devices which produce the feeding motion of said materials.

25. A machine for making box or crate blanks, comprising wire feeding and stapling and work feeding devices coöperating to fasten the blank materials together in successively spaced relation, and mechanism including an element which is movable into and out of the plane of the blanks and arranged for automatically preventing the driving of staples between blanks, having provisions for interrupting the wire feeding device to prevent the formation of staples without stopping the running of the stapling device.

26. A box blank machine comprising staplers, means for feeding the blank materials to the staplers in successively spaced relation, and automatically governed mechanism including an element which is movable into and out of the plane of the blanks and arranged for controlling said staplers without interrupting the running thereof to prevent the driving of staples between the blanks.

27. A box blank stapling machine having one or more staples and comprising instrumentalities to feed the materials forward, and means floating on the upper surface of said materials to rise and fall and thereby automatically control some portion of said machine, without stopping the motion of the staplers, said instrumentalities being provided with spacing blocks held a fixed distance apart to establish spaces at predetermined intervals in the materials, and said means being rendered operative by dropping downward in said spaces.

28. In a box blank machine, the combination of devices to form spaces at intervals in the materials, mechanism to fasten the materials together, a device to feed wire to said mechanism, and means engaging the top surface of the blanks and controlled by said previously formed spaces periodically to control said device for feeding wire to said mechanism.

29. In a box blank machine, the combination of devices to form spaces at intervals in the materials, mechanism to fasten the materials together, a device for cutting wire, and means controlled by said previously formed spaces periodically to control said wire cutting device.

30. In a machine for making box blanks, feeding means for driving the material through the machine, stapling means, means to form spaces between the blanks, and means operated by the box-blank material and serving automatically to intermittently interrupt the action of the stapling means upon said material, said interrupting means having a movable controller disposed in position to rest upon the upper surface of the passing material and enter the spaces between blanks.

31. In a machine for making box-blanks, feeding means for driving the material through the machine, stapling means, means including an element supported by the blanks and operated by the box-blank material and serving automatically to intermittently interrupt the action of the stapling means upon said material, and means to form spaces in the material before the stapling thereof.

32. A machine for stapling suitably prepared materials to form blanks for the sides of boxes or crates, comprising means for moving the materials along, means for wiring the materials together to form blanks, mechanism for cutting the blanks apart, an element arranged to enter the spaces between blanks to control said mechanism, and power-transmitting connections for operating said mechanism, having a clutch governed by the operation of said first-mentioned means, said mechanism comprising a punch and die disposed respectively above and below the work.

33. A machine for stapling suitably prepared materials to form blanks for the sides of boxes or crates, comprising means to propel the blank materials forward, means for applying a continuous binding to secure said materials together to form blanks, a clutch for governing the operation of a portion of the machine, relatively to the spaces which are necessary between blanks to provide end-portions of said binding at opposite ends of each blank, and means including an element arranged to enter the spaces between blanks to control said clutch.

34. A box blank stapling machine comprising instrumentalities to feed the materials forward, a stapler having means to apply a binding wire to the materials to form blanks, and means floating on the upper surface of said materials to rise and fall in spaces between blanks and thereby automatically control the action of said stapler.

35. A box blank stapling machine comprising instrumentalities to feed the materials forward, a stapler having a device to feed wire for the staples and coöperating with said instrumentalities to form blanks from the said materials, and means floating on the upper surface of said materials to rise and fall in spaces between blanks and thereby automatically control said device, and said device being rendered inoperative each time said means encounters a space.

36. A box blank stapling machine comprising instrumentalities to feed the materials forward, a stapler coöperating with the said instrumentalities to form blanks from the said materials, a device to cut wire, and means floating on the upper surface of said materials to rise and fall in spaces between blanks and thereby automatically control said device without stopping the motion of the stapler, and said device being rendered operative each time said means encounters a space.

37. A box blank machine comprising instrumentalities to feed the materials forward, a stapler, a wire feed mechanism therefor including a ratchet pawl, a roller floating on the upper surface of said materials to rise and fall and thereby control said pawl, a pivoted support for said roller, a rock shaft, and a connection between said support and shaft, said rock shaft being operatively associated with the said ratchet pawl.

38. A box blank stapling machine comprising instrumentalities to feed the materials forward, a stapler, and means floating on the upper surface of said materials to rise and fall and thereby control the action of said machine without stopping the motion of the stapler, said instrumentalities including an endless traveling feed belt having spacers carried thereon to form spaces between blanks, and said means having an element which is movable into and out of said spaces.

39. In a machine for making box-blanks, stapling means, means for guiding the box-blank material through the stapling plane, with the necessary spaces formed therein, an element to engage the said material, which element is movable into and out of the plane of the traveling blanks, and means caused to operate by entrance of said element into spaces occurring at intervals in the box-blank material to intermittently interrupt the action of the stapling means upon said material.

40. In a machine for making box-blanks, stapling devices, means for guiding the box-blank material through the stapling plane, and means operated by the box-blank material to intermittently interrupt the action of the stapling devices upon said material, without interrupting the motion of said devices, said interrupting means having a movable controller disposed in position to rest upon the upper surface of the passing material.

41. A machine for making box-blanks from strips of sheet material, comprising endless link-belts, means to support said strips a distance above the tops of said belts, spacers to separate the edges of said strips, devices to actuate said belts a plurality of times for each blank, and mechanism for applying continuous binding wires to said strips between said belts.

42. A machine for making box-blanks from strips of sheet material, comprising endless link-belts, means to support said strips a distance above the tops of said belts, spacers to separate the edges of said strips, devices to actuate said belts a plurality of times for each blank, and mechanism for applying continuous binding wires to said strips between said belts, said means including blocks which are adjustable toward and away from each other on said belts to accommodate strips of different widths.

43. A machine for making box-blanks from strips of sheet material, comprising endless link-belts, means to support said strips a distance above the tops of said belts, spacers to separate the edges of said strips, devices to actuate said belts a plurality of times for each blank, mechanism for applying continuous binding wires to said strips between said belts to flexibly connect said strips together, said belts being adjustable toward and away from each other, and blocks to support said spacers on the belts, each block having a fastening device, and said belts having grooves in which said fastening devices extend to permit adjustment of the blocks toward and away from each other.

44. A machine for making box-blanks from strips of sheet material, comprising endless link-belts, means to support said strips a distance above the tops of said belts, spacers to separate the edges of said strips, devices to actuate said belts a plurality of times for each blank, and mechanism for applying continuous binding wires to said strips between said belts to flexibly connect said strips together, said belts having relatively long center links on which said spacers are mounted for adjustment toward and away from each other, and having relatively short side links to connect said long links.

45. A machine for making box-blanks from strips of sheet material, comprising endless link-belts, means to support said strips a distance above the tops of said belts, spacers to separate the edges of said strips, devices to actuate said belts a plurality of times for each blank, and mechanism for applying continuous binding wires to said strips between said belts, said means including stationary guides for the ends of said strips.

46. A box-blank machine comprising instrumentalities for feeding materials and inserting fastening devices therein, and means for automatically interrupting the driving of the fastening devices, without stopping the machine, including an element which directly engages the materials and operates by movement thereof into and out of the plane of the traveling blanks to govern the operation of said means, said element being operated a plurality of times for each blank.

Signed by us at St. Joseph, Berrien county, Michigan, this 1st day of March, 1912.

EDWARD CRAIG.
WILLIAM H. RAY.

Witnesses:
T. M. GILLMAN,
A. S. HABEL.